US010839415B2

(12) United States Patent
Fleming et al.

(10) Patent No.: US 10,839,415 B2
(45) Date of Patent: Nov. 17, 2020

(54) AUTOMATED OFFER GENERATION RESPONSIVE TO BEHAVIOR ATTRIBUTE

(71) Applicant: INTERNATIONAL BUSINESS MACHINES CORPORATION, Armonk, NY (US)

(72) Inventors: Rodney L. Fleming, Bedford, TX (US); Shiju Mathai, Carrollton, TX (US); Wade A. Miller, Southlake, TX (US)

(73) Assignee: International Business Machines Corporation, Armonk, NY (US)

( * ) Notice: Subject to any disclaimer, the term of this patent is extended or adjusted under 35 U.S.C. 154(b) by 773 days.

(21) Appl. No.: 15/289,393

(22) Filed: Oct. 10, 2016

(65) Prior Publication Data

US 2018/0101860 A1    Apr. 12, 2018

(51) Int. Cl.
*G06Q 30/02*    (2012.01)

(52) U.S. Cl.
CPC ..... *G06Q 30/0239* (2013.01); *G06Q 30/0224* (2013.01)

(58) Field of Classification Search
USPC ................................ 705/14.66, 7.3
See application file for complete search history.

(56) References Cited

U.S. PATENT DOCUMENTS

| 8,484,241 | B2 * | 7/2013 | Bouse | H04L 67/306 |
| | | | | 705/14.36 |
| 2010/0161379 | A1 * | 6/2010 | Bene | G06Q 30/02 |
| | | | | 705/7.31 |
| 2012/0130819 | A1 * | 5/2012 | Willcock | G06Q 30/02 |
| | | | | 705/14.66 |
| 2012/0221418 | A1 | 8/2012 | Smith | |
| 2014/0372228 | A1 | 12/2014 | Paz-Pujalt | |

(Continued)

OTHER PUBLICATIONS

Peter Mell et al, The NIST Definition of Cloud Computing, National Institute of Standards and Technology, Publication 800-145, 2011.

(Continued)

*Primary Examiner* — Afaf Osman Bilal Ahmed
(74) *Attorney, Agent, or Firm* — Patrick J. Daugherty; Daugherty & Del Zoppo Co., LPA

(57) ABSTRACT

Programmable device processors are configured by aspects of the present invention to automatically generate item offers in response to behavior attributes determined for a person receiving the offer. Said configured processor determines current personality traits for the person from analysis of activity data, identifies geographically proximate transactional channels available for presentment of an offer to the person, and generates an item offer to include attribute values that match a determined personality trait and satisfy a need indicated by demographic data applicable to the person. The configured processor select one of the available transactional channels for presentment of the item offer to the person, in response to determining an indication in the transactional behavior of a higher likelihood of acceptance by the person of the presented offer when presented via the selected transactional channel, relative to presentment via another, unselected one of the currently available transactional channels.

20 Claims, 4 Drawing Sheets

(56) References Cited

U.S. PATENT DOCUMENTS

2015/0161710 A1    6/2015   Korobkov
2016/0110524 A1*  4/2016   Short .................... G06Q 30/02
                                                                   705/2

OTHER PUBLICATIONS

Patti Williams, Emotions and Consumer Behavior, Journal of Consumer Research, Inc., vol. 40, No. 5, 2014.
Yong Zheng et al, The Role of Emotions in Context-aware Recommendation, Center for Web Intelligence, School of Computing, DePaul University, 2013.
Institute of Technology Tallaght, Personality Based Recommendation Systems, ITT Dublin, 2016.

* cited by examiner

AUTOMATED OFFER GENERATION RESPONSIVE TO BEHAVIOR ATTRIBUTE

BACKGROUND

Product offerings may succeed or fail based on matching customer perceptions of choice, value, convenience and personalization, sometime regardless of objective qualities of an offered product. On-line options may empower customers by providing a large number of competing offers, enabling customers to choose between more providers via comparing pricing, customer experiences and other differentiators. As a result, customers tend to be more selective and demanding when it comes to selecting and staying with any given provider. They want to procure goods and services on their terms, for example through preferred interaction channels (on-line, via telephone, in a traditional bricks and mortar facility, etc.), and at desired levels of pricing, cost, access and support.

Providers commonly attempt to categorize and segment potential consumers or customers by attributes of historic revenue and demographic data, including age or age groupings, marital status, income or income bands, and geographic location (state, city, zip code, etc.), in order to design product offerings that satisfy common needs or desires of consumers as categorized within a given demographic grouping. Product offerings may be further differentiated based on observed spending or purchasing trends that are correlated with the time-of-day, a given geography location, and other general demographic categories.

BRIEF SUMMARY

In one aspect of the present invention, a computerized method for automated offer generation responsive to behavior attributes includes executing steps on a computer processor. Thus, a computer processor is configured to determine a current personality trait (current emotional state, personality tendency, personality category, etc.) for a person from analysis of current activity data applicable to the person, and to identify transactional channels currently available for presentment of an item offer to the person, including personal programmable device displays and business locations that are geographically proximate to a location of the person. The configured processor analyzes transaction experience data of the person to determine a transactional behavior spending pattern tendency. Thus, the configured processor generates an item offer to include an attribute value that matches the current personality trait and satisfies a need indicated by demographic data applicable to the person. The configured processor selects one of the currently available transactional channels for presentment of the item offer to the person in response to determining an indication in the transactional behavior spending pattern tendency of a higher likelihood of acceptance by the person of the presented offer when presented via the selected transactional channel, relative to presentment via another, unselected one of the currently available transactional channels.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to determine a current personality trait (current emotional state, personality tendency, personality category, etc.) for a person from analysis of current activity data applicable to the person, and to identify transactional channels currently available for presentment of an item offer to the person, including personal programmable device displays and business locations that are geographically proximate to a location of the person. The configured processor analyzes transaction experience data of the person to determine a transactional behavior spending pattern tendency. Thus, the configured processor generates an item offer to include an attribute value that matches the current personality trait and satisfies a need indicated by demographic data applicable to the person. The configured processor selects one of the currently available transactional channels for presentment of the item offer to the person in response to determining an indication in the transactional behavior spending pattern tendency of a higher likelihood of acceptance by the person of the presented offer when presented via the selected transactional channel, relative to presentment via another, unselected one of the currently available transactional channels.

In another aspect, a computer program product for automated offer generation responsive to behavior attributes has a computer-readable storage medium with computer readable program code embodied therewith. The computer readable hardware medium is not a transitory signal per se. The computer readable program code includes instructions for execution which cause the processor to be configured to determine a current personality trait (current emotional state, personality tendency, personality category, etc.) for a person from analysis of current activity data applicable to the person, and to identify transactional channels currently available for presentment of an item offer to the person, including personal programmable device displays and business locations that are geographically proximate to a location of the person. The configured processor analyzes transaction experience data of the person to determine a transactional behavior spending pattern tendency. Thus, the configured processor generates an item offer to include an attribute value that matches the current personality trait and satisfies a need indicated by demographic data applicable to the person. The configured processor selects one of the currently available transactional channels for presentment of the item offer to the person in response to determining an indication in the transactional behavior spending pattern tendency of a higher likelihood of acceptance by the person of the presented offer when presented via the selected transactional channel, relative to presentment via another, unselected one of the currently available transactional channels.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
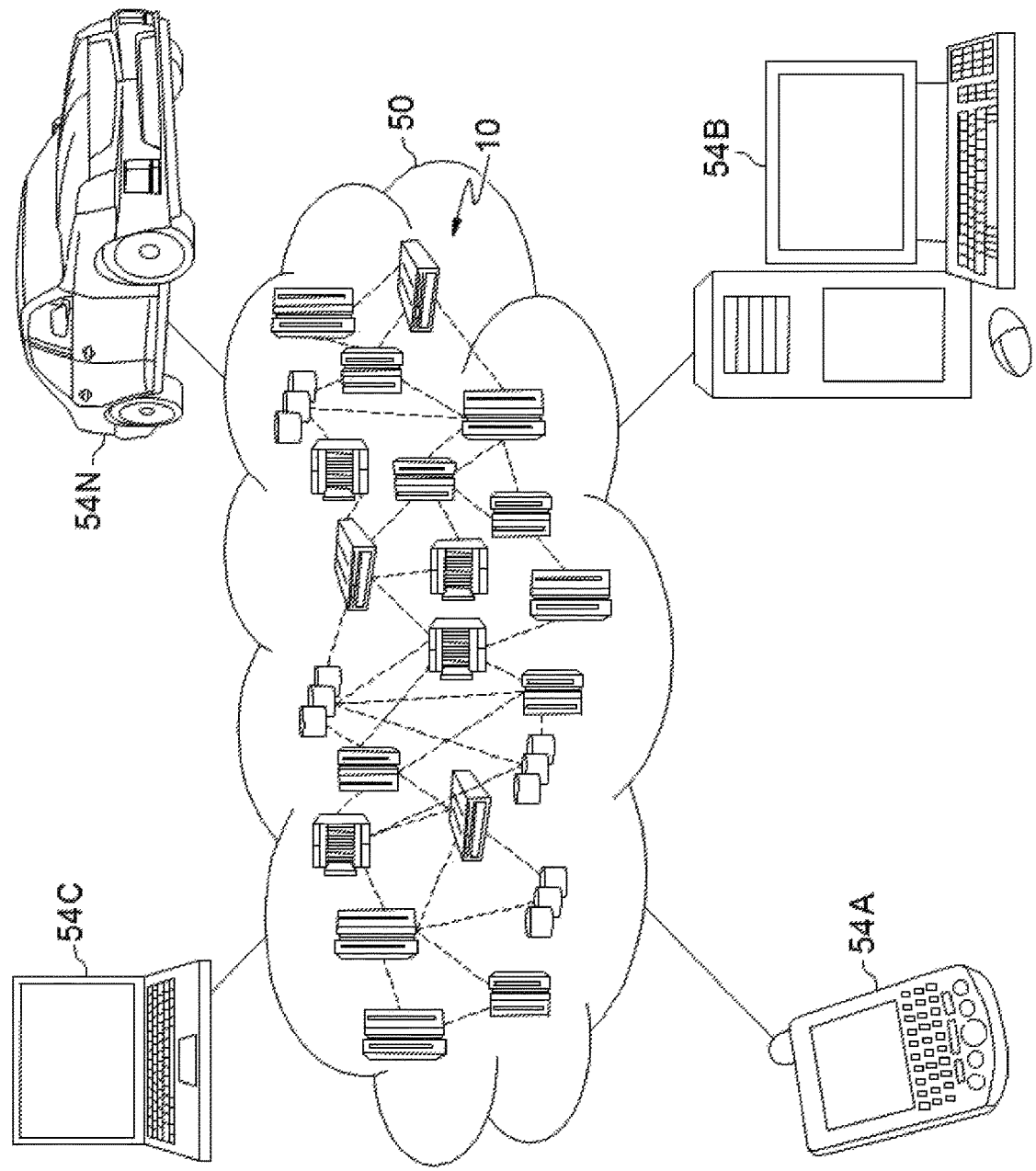
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
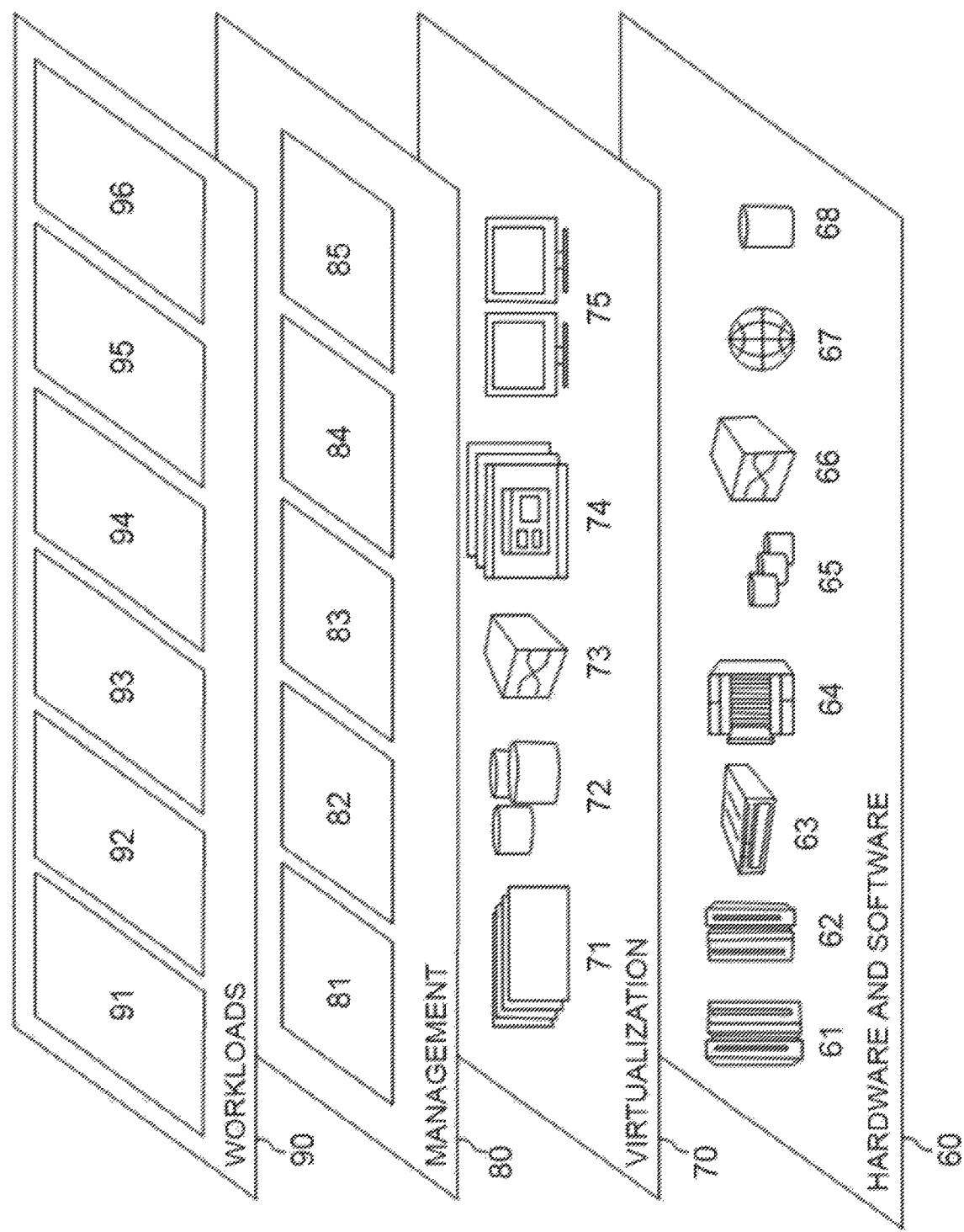
FIG. 2 depicts a cloud computing node according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Figure 4:
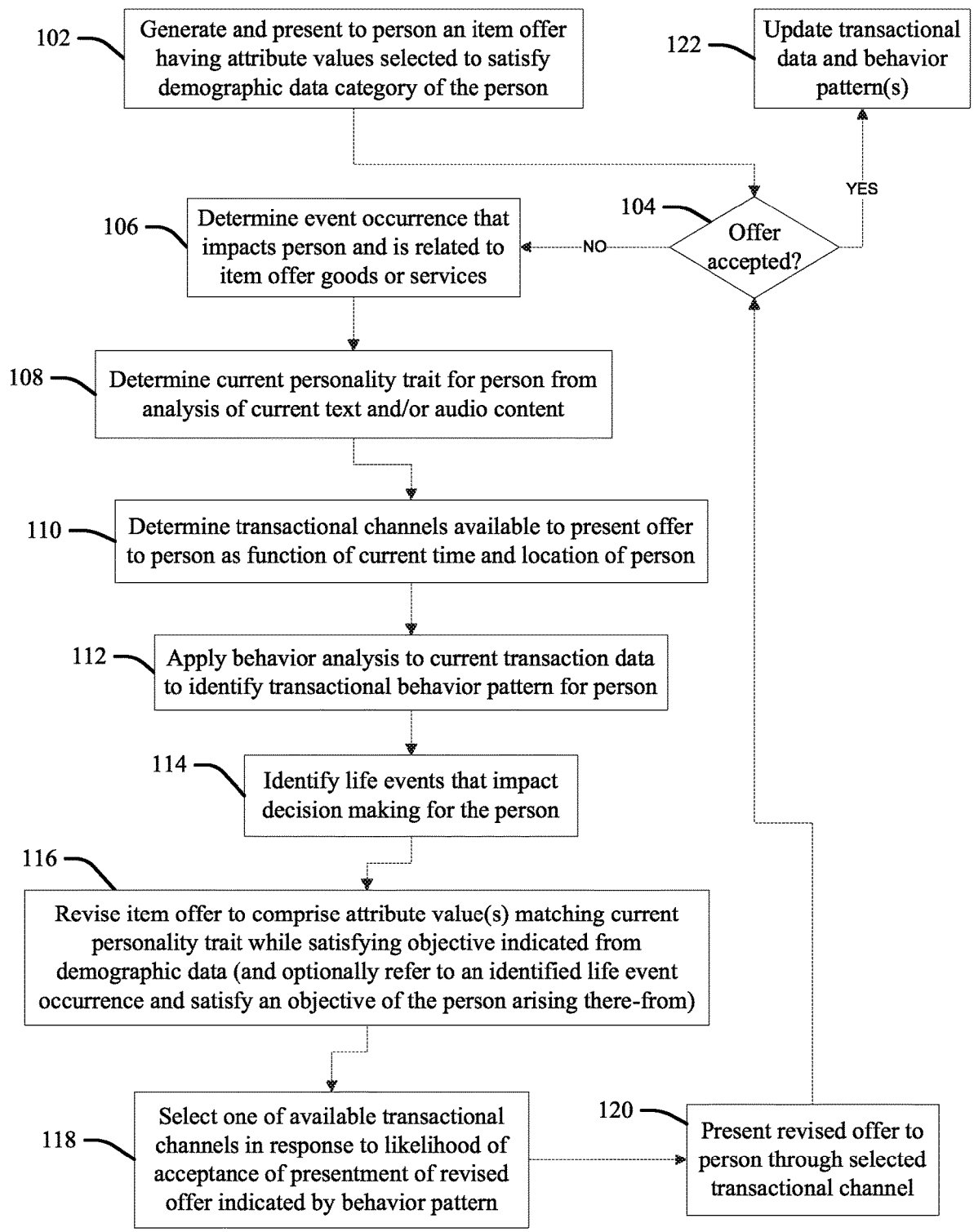
FIG. 4 is a flow chart illustration of a process or system for automated offer generation responsive to behavior attributes according to an embodiment of the present invention.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 for automated offer generation responsive to behavior attributes according to embodiments of the present invention, for example to execute the process steps or system components or tasks as depicted in FIG. 4 below.

Figure 3:
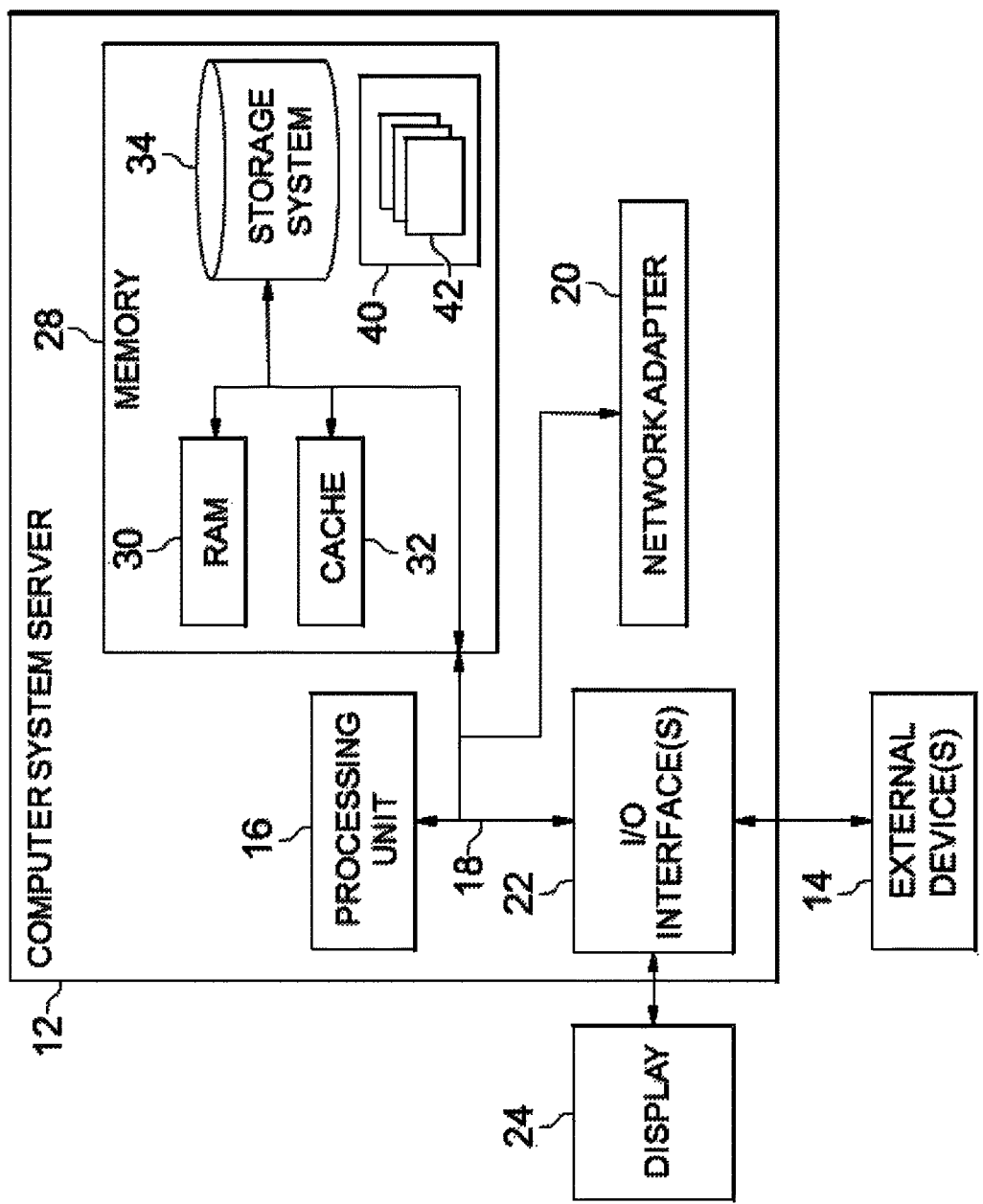
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 4 illustrates a process or system according to the present invention for automated offer generation responsive to behavior attributes. At 102 a processor configured according to an aspect of the present invention generates and presents an item offer (of goods or services) to an individual person as a potential or continuing customer or consumer. The presentment of the item offer at 102 comprehends driving a graphic display device of a personal programmable device of the person (a smart phone, tablet, laptop, personal computer, etc.) to display a promotional message or advertisement, and driving an audio device of the personal programmable device to broadcast alert tones and audio content of such messages or advertisements. The presented offer has one or more attribute values that are selected to satisfy (match, meet, correspond to, etc.) an objective (preference, desire, aspiration, need, requirement, etc.) in accepting the offer that is indicated for the person from demographic data category applicable to the person (data that is common to the person or shared with other, different people within a demographic category). The demographic category is selected from age or age grouping, marital status, household income or income band, geographic location (state, city, zip code, etc.) age, average household spending on goods or services within a common category of the goods or services of the offered item, and still other demographic categories will be apparent to one skilled in the art.

At 104 said configured processor determines whether or not the person has refused the item offer. Examples of determination of refusal of the offer include identifying the refusal as a function of an elapsed time from a time of the offer, a deletion of an email message containing the offer, a data input indicating that the offer was declined in a telephone call or in-person meeting with a sales representative presenting the offer, and still other examples of determinations of declining the offer will be apparent to one skilled in the art.

At 106 said configured processor determines an event occurrence that impacts the person (for example, one that involves the person directly, or indirectly has effects upon the person via relationship to a friend, relative or associate of the person, or sharing demographic category of another effected person, etc.), and that is related to the goods or services of the item offer. In one example the configured processor determines the event occurrence in response to data indicating an overdraft fee charged to an account of the person as customer for insufficient funds balance, wherein the item offer is overdraft protection service for the account that was previously declined by the customer (at 104) and thereby related to the overdraft occurrence. The event occurrence determination may also be via content analysis of a posting by a person on a social media site that determines an indication of the person of a preference for extending a government tax credit program for purchasers of hybrid automobiles, wherein the item offer was a direct email solicitation to the person to purchase a hybrid automobile in consideration for a manufacturer rebate that expired (and therefor was effectively declined) last month. Still other examples will be apparent to one skilled in the art.

At 108, in response to said event occurrence determination at 106, the configured processor determines a current personality trait for the person from analysis of current activity data applicable to the person that extracts a spectrum of cognitive and social characteristics of the person (for example, via natural language processing (NLP) and linguistic analytics). Processed current activity data includes text and voice content, and illustrative but not exhaustive examples include call notes, text messages, chat transcripts, voice mail messaging, emails, customer surveys, complaints and other customer correspondence, social media posts, web click streams, transaction and other past experience history.

Determining the personality trait comprehends determining indications of current emotional state (anger, sadness, elation, satisfaction, resignation, etc.) and general personality tendencies or categories (for example, introvert, extrovert, openness, closeness, loyalty, interested in self-improvement or self-enhancement products and activities, preference for conservative or aggressive financial planning products and approaches, preference for high-risk and high potential reward, or instead for low-risk and moderate or even low potential return, work or investment opportunities, etc.)

At 110 the configured processor determines current transactional channels available for presentment of offers to the person, which includes identifying available or most proximate channels for receiving a presentation of the item offer or a revised item offer at a current time and location of the person. Channels thus identified for offer presentment include programmable devices of the person (smart phone, tablet laptop or personal computer, etc.) that may display or broadcast audio-visual advertisements and other offer presentations; and business locations that comprise automated teller machines (ATM's), offices, stores or other physical items or areas that the person is currently located at or proximate to, at which an item offer may be presented to the person (via an ATM display, through a sales representative located therein, etc.). Geographic location of the person may be established by the configured processor or by a service provider via processing internet protocol address data or global positioning satellite (GPS) data of a personal programmable device used by or associated with the person. The configured processor may define proximity to the business locations in terms of travel cost values (distance, time, travels expenses (transit fares or tolls), etc.) or combinations thereof. Thus, the configured processor may determine or identify a proximate location as one that is closer to, or requires less travel time or lower fares or toll or operating costs to reach, relative to another of the identified transactional channel locations; or one that has travel cost value that is less than a specified proximity threshold value.

At 112 the configured processor applies behaviors analysis to current transaction experience data (including current and historic transaction data) in order to identify one or more transactional behavior patterns for the person. Illustrative but not limiting or exhaustive examples of identified transactional behavior patterns include a history or frequency of previous financial account defaults (for example, another overdraft two months ago, five late loan payments over three year period, each less than 30 days late, three late credit card payments over two years, each forgiven, etc.), time-of-day spending tendencies (for example, determining that the person executes 90% of on-line e-commerce purchases during evening period from 8 PM through Midnight, from a residential IP address, or 80% of banking service purchases during business day hours via telephone calls originating on mobile phone or on applications executing thereon or from office IP address, etc.), spending categories and geographic location (for example, determining the geo-locations of physical stores that are utilized for majorities of amounts or income percentages expended on housing, food, clothing, houseware, hardware, automobile, bicycle or other types or categories of purchases, as a function of historic purchasing data of the person); and determining total spending amounts allocated to a spending category and a preferred geographic location.

At 114 the configured processor identifies life events that impact decision making processes of the person that are related to accepting the offered item. Illustrative but not limiting or exhaustive examples of said life events include school or degree program graduation, marriage, birth of child, relocation, inheritance of estate assets, lottery winnings, job promotions, new jobs, retirement. Data analyzed to determine life event occurrences includes social media posts, call notes, email and other messaging that refers to details or other indicia of the events, for example, "congratulations on the new baby!"

At 116 the configured processor revises the initial item offer data or terms to generate a revised (new) offer for the person that comprise one or more attribute values that differ from the original offer that match the current emotional state or personality trait determined for the person (at 108) and that also satisfy the need indicated from the demographic data (at 102). Where the current personality trait determined for the person is a negative emotional state (anger, sadness, dismay, etc.), the configured processor may generate the revised (new) offer to match the emotional state by offering to ameliorate an impact on the person by the event indicated as precipitating the negative emotional state in consideration for acceptance of the offer by the person: for example, a discounted overdraft protection service may be offered, to offset the costs ensured from an overdraft fee that is pending or recently imposed. Still other ameliorations will be apparent to one skilled in the art.

The configured processor may also generate the revised (new) offer at 116 to expressly refer to the identified life event occurrence and to a satisfy an objective of the person arising from identified life event occurrences determined as applicable to the person (at 114). For example, the offer may include a gift in observation of program graduation, a marriage status change, a childbirth; a discount coupon for housing goods in associated with a relocation; a luxury item promotion associated with lottery winnings, a job promotion, or a new job; and a suggestion of service reductions or savings associated with a reduction in current fees in response to recognizing a retirement from employment.

At 118 the configured processor selects one or more of the transactional channels determined as currently available and proximate to person (at 110) in response to an indication in the historical transactional behavior patterns determined for the person (at 112) of a likelihood of acceptance by the person of the revised offer (for example, from a history of acceptance of similar offers presented via said selected channel, in some cases while the person has evidenced a personality trait similar to the trait determined at 108).

At 120 the configured processor presents the revised offer to the person through the selected transactional channel. In some aspects the revised offer is presented during the time period of acceptance by the person of a similar offer presented via the selected channel and accepted, as indicated by the historical transactional behavior patterns determined for the person.

The present aspect is self-learning via a feedback relationship or structure mechanism. More particularly, assessment of the acceptance of the respective original or revised offer presentments at 122 results in additional iterations until the person accepts an offer as determined at 104. Once an offer is accepted at 104, the configured processor updates the profile trait data and transaction data of the person at 122, wherein the updated data is used in subsequent iterations for other offers to the person, the updated data thereby used to learn and improve subsequent offer revisions and channel selections.

In one example of an implementation of the process or system of FIG. 4, a processor configured according to an aspect of the present invention generates an initial offer presented for overdraft protection (at 102) with a low priority or likelihood of success based on a demographic category of a customer receiving the offer, wherein the offer extended to the customer is determined as ignored (not accepted, at 104). Due to recent spending behavior (for example, for the current month) the customer incurs an overdraft and an overdraft fee is charged, and said events are determined by the configured processor (at 106) to both impact the customer (the customer is charged fees) and be related to the recently refused offer (acceptance of the offered overdraft protection would have prevented the overdraft fees). The customer posts social media text content about the overdraft charge, and text analytics applied to the text content by the configured processor determines (at 108) that the customer expresses disdain about the overdraft fee, and the configured processor updates the customer personality trait status accordingly.

The configured processor determines (at 110) that transactional channels available to present offer to person as function of current time and location of person include direct text message, email and a nearest office or branch at which a teller or other sales representative may in person present a revised offer for overdraft services. Via behavior analysis (at 112) the configured processor identifies recent and historic customer experiences, including numbers and frequencies of any previous overdraft fees, late fees assessed for late loan or credit card payments, etc. Via review of social media activity of the customer for recent life events (at 114) the configured processor determines that the customer has recently become the parent of child.

Accordingly, the configured processor revises the original overdraft services offer (at 116) in response to determining (at 112) that the customer rarely incurs overdraft or late payment fees, including no other charges reported in the last year in credit report data; in response to determining (at 108); that the customer is currently angry about the overdraft fee; and in response to identifying (at 114) the recent birth of a child, the revised offer is generated by the configured processor to include a statement congratulating the customer on the birth of the child, expressing understanding that such events may temporarily disrupt financial accounts, noting that the customer rarely creates overdraft conditions, offering an apology (expressing regret) for charging the overdraft fee in view of the new birth and prior stellar credit history, and offering to waive the recently levied overdraft fee if the customer aggress to sign up for (purchase) the offered overdraft protection service.

In response to determining (at 112) that the customer behavior patterns indicate that the customer prefers branch visits at lunch time, over text or on-line portal mechanisms, to revise financial account terms, and that the customer is currently near to a branch (at 110) and that the current time is during a business day morning period, the configured processor selects the nearest branch for the transaction channel associated with the revised offer (at 118), and contacts the customer with a presentment of the revised offer (by text, email, telephone, etc.) that conveys the terms of the offer and requests that the customer stop by the nearby branch at lunch hour to accept in person the offer from a teller or other sales representative, and also a personal gift for the customer in honor of the new child (a baby gift, a "new parent coffee mug, etc.)

In response, the customer visits the branch and accepts the revised overdraft protection service offer, the baby gift, and expresses happiness to the teller with both the fee reversal and the gift, and with the thoughtful personal service. Feedback data from a teller, or from the customer directly, via a follow-up survey, a social media posting, etc., is processed by the configured processor (at 122), which may determine that the feedback data indicates that the customer's emotional state has been improved by the revised offer (that the customer is now happy with the account service provider), and the accepted terms are used to update transactional history for the customer for use in creating future offers and to determine their relative likelihood of acceptance (for example, more likely if correlated more closely to the accepted offer than to another, rejected offer; or to another similar life event or current behavior trait context of the customer).

Processors configured according to aspects of the present invention may apply personality analysis engines to data inputs to determine (at 108) that a first customer has a "socially responsible" attribute, and in response generate a revised offer that includes terms or recommends products labeled as socially responsible, wherein such terms and products are not offered to another, second customer who doesn't have the same attribute, even though they are both categorized within a same, general demographic category that is otherwise used to generate similar offers to each customer under the prior art.

Processors configured according to aspects of the present invention provide advantages in presenting opportunities for providers of goods and services to deliver value via offers differentiated by personalized, relevant and timely attributes that are responsive to customer needs and desires as indicated by their behavioral attributes. Said configured processors automatically generate and present revised offers via selected transaction channels through processes that are uniquely responsive to individual consumers based on assessing current needs or desires that are unique to that customer within a generic demographic grouping, as indicated by individualized behavioral analysis of account usage, transactional history, social media activity, etc. Processors configured according to aspects of the present invention thus break conventional demographic segments down further into novel, individualized micro segment categories, wherein product association models are effectively created for the micro segments, and specific product recommendations created for customers using the product association models.

Personality insights and emotion are not currently used to further refine micro segments or to personalize interactions with customers in the prior art. In contrast, processors configured according to aspects of the present invention use personality insight and contextual emotional clue determined from data inputs to create specific micro segments. For example, compare first and second customers that are within a common demographic grouping through having similar age, family makeup, income and spending pattern attributes. If the first customer is very conservative and the second has a large appetite for risk, a service provider would generally desire to make very different product offers to these two customers that would be contrary to the common, undifferentiated offers indicated under the prior art by their shared demographic categories. Adding dimensional attributes determined by personality insight to the automated segmentation enables processors configured according to aspects of the present invention to micro segment the first and second customers into different behavioral clusters.

By considering dimensions of personality insight, processors configured according to aspects of the present invention generate segmentations that cluster customers by bases not considered via demographic data alone. Gauging customer emotions at a time of interaction enables the configured processors to generate offers that are segmented to a customer, and wherein a transaction interaction may be personalized to create a more meaningful experience for the customer relative to the prior art. The configured processor determine a more complete picture of customers' current financial needs and priorities, to thereby generate and provide meaningful product and service offers and cross-sell opportunities when and where they matter most. Processors configured according to aspects of the present invention aggregate and optimize recommendations based on combination of location, context, emotion, personality, life-events, and behavior to provide more-personalized communications and tailored offers.

In some aspects the behavioral micro segments supersede base demographic categories. Processors configured according to aspects of the present invention combine customers having divergent demographic attributes, that would otherwise result in differentiated offers under the prior art due to their demographic differences, into behavioral micro segments to generate and present offers commonly tailored to their indicated needs and desires, as the customers within the behavioral micro segments may be much more alike in their consumer behavior than would be expected or indicated by typical demographic segmentation models. Similarly, by gauging the customer's emotion at the time of interaction, processors configured according to the present invention further segment the customers and personalize interactions to create more meaningful or satisfactory experiences for the customer.

Processors configured according to aspects of the present invention provide a more complete picture of current customer financial needs and priorities relative to the prior art, and thereby more meaningful product and service offers and cross-sell opportunities, targeted to times or locations where they matter most to the indicated needs and desires. The configured processors aggregate and optimize recommendations based on combinations of location, context, emotion, personality, life-events and behavior to provide more-personalized communications and tailored offers relative to those generated under the prior art.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automated offer generation responsive to behavior attributes, comprising executing on a computer processor the steps of:
    determining via content analysis of content of a posting by a person on a social media site an occurrence of a life event that has an impact on the person and that is relevant to a decision-making process in accepting an offer;
    determining via natural language processing and linguistic analytics of current social media site activity data applicable to the person that the impact on the person of the life event occurrence comprises a current negative emotional state that is selected from the group consisting of anger, sadness and dismay;
    identifying as a function of processing global positioning satellite location data and internet protocol address data a plurality of transactional channels that are each currently available for presentment of an item offer to the person and geographically proximate to a current location of the person and are selected from a group consisting of personal programmable device displays and business locations;
    applying behavior analysis to transaction experience account usage data of the person to determine a preferred time-of-day value and a preferred geographic location value of a transactional behavior spending pattern tendency, wherein the transactional experience account usage data comprises account usage data, transactional history data and the current social media site activity applicable to the person;
    generating an item offer that comprises an attribute value of the item offered that ameliorates the current negative emotional state, satisfies an objective of the person associated to the identified life event occurrence and satisfies a need of the person that is indicated by demographic data applicable to the person, wherein the demographic data applicable to the person is selected from the group consisting of marital status, household income, household income band, geographic location, average household spending on goods or services within a common category of the offered item; and
    selecting a one of the plurality of currently available transactional channels for presentment of the item offer to the person that has a geographic location value that matches the preferred geographic location value and is more proximate to the person during the preferred time-of-day value, relative to presentment via another, unselected one of the currently available transactional channels.

2. The method of claim 1, wherein the current social media site activity data analyzed by natural language processing and linguistic analytics is selected from the group consisting of text message content, chat transcripts, a voice mail message, an email, a complaint, a social media post, and a web click stream.

3. The method of claim 1, further comprising:
    selecting the transactional behavior spending pattern tendency from one or more transactional spending patterns for the person which comprise the group consisting of: a frequency of financial account default, and a time-of-day spending pattern that comprises hours of a day and a percentage of e-commerce purchases during the hours.

4. The method of claim 1, further comprising:
    determining an indication in the transactional behavior spending pattern tendency of a higher likelihood of acceptance by the person of the presented offer when presented via the selected transactional channel from a historic acceptance of the person of a similar offer presented via said selected channel while the person evidenced a personality trait that is similar to the current determined personality trait, and
    wherein the current determined negative emotional state is selected from the group consisting of anger, sadness, elation, satisfaction, resignation, introvert, extrovert, openness, closeness, loyalty, interest in self improvement, interest in self enhancement products and services, preference for conservative final planning products and approaches, preference for aggressive financial planning products and approaches, preference for high-risk and high potential reward work opportunities, preference for high-risk and high potential reward investment opportunities, preference for low-risk and moderate potential reward work opportunities, and preference for low-risk and moderate potential reward investment opportunities.

5. The method of claim 4, further comprising:
    presenting the item offer to the person via the selected transactional channel for a time period of acceptance by the person that includes a time of a historic acceptance of the person of a similar offer presented via said selected channel, wherein the item offer is in response to a prior refusal of a prior offer for the item; and
    determining the prior refusal of the prior offer for the item as a function of an indication which is selected from the group consisting of: an elapsed time from a time of the prior offer, a deletion of an email comprising the prior offer, a data input indicating that the prior offer was declined in a telephone call, and a data input indicating that the prior offer was declined in an in-person meeting with a sales representative presenting the prior offer.

6. The method of claim 1, further comprising:
    wherein the item offer is selected from the group consisting of: an offer to purchase overdraft protection of an account of the person, and an offer to purchase an automobile;
    generating the item offer which expressly refers to the identified life event occurrence and satisfies an objective of the person arising from the identified life event occurrence; and
    wherein the life event is selected from the group consisting of: a program graduation, marriage status change, childbirth, relocation, inheritance, winning a lottery, a job promotion, a new job, and retirement from employment.

7. The method of claim 6, wherein the step of generating the item offer comprises:
expressing regret for another event indicated as precipitating the negative emotional state; and
offering to ameliorate an impact on the person by the event indicated as precipitating the negative emotional state in consideration for acceptance of the offer by the person.

8. The method of claim 1, further comprising:
integrating computer-readable program code into a computer system comprising a processor, a computer readable memory in circuit communication with the processor, and a computer readable storage medium in circuit communication with the processor; and
wherein the processor executes program code instructions stored on the computer-readable storage medium via the computer readable memory and thereby performs the steps of determining that the impact on the person of the life event occurrence comprises the current negative emotional state, identifying the plurality of transactional channels each currently available for presentment of the item offer to the person, applying behavior analysis to the transaction experience account usage data of the person to determine the preferred time-of-day value and the preferred geographic location value of transactional behavior spending pattern tendency, generating the item offer, and selecting the one of the currently available transactional channels for presentment of the item offer to the person.

9. The method of claim 8, wherein the computer-readable program code is provided as a service in a cloud environment.

10. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
determines via content analysis of content of a posting by a person on a social media site an occurrence of a life event that has an impact on the person and that is relevant to a decision-making process in accepting an offer;
determines via natural language processing and linguistic analytics of current social media site activity data applicable to the person that the impact on the person of the life event occurrence comprises a current negative emotional state that is selected from the group consisting of anger, sadness and dismay;
identifies as a function of processing global positioning satellite location data and internet protocol address data a plurality of transactional channels that are each currently available for presentment of an item offer to the person and geographically proximate to a current location of the person and are selected from a group consisting of personal programmable device displays and business location;
applies behavior analysis to transaction experience account usage data of the person to determine a preferred time-of-day value and a preferred geographic location value of a transactional behavior spending pattern tendency, wherein the transactional behavior experience account usage data comprises account usage data, transactional history data and the current social media site activity applicable to the person;
generates an item offer that comprises an attribute value of the item offered that ameliorates the current negative emotional state, satisfies an objective of the person associated to the identified life event occurrence and satisfies a need of the person indicated by demographic data applicable to the person, wherein the demographic data applicable to the person is selected from the group consisting of marital status, household income, household income band, geographic location, average household spending on goods or services within a common category of the offered item; and
selects a one of the plurality of currently available transactional channels for presentment of the item offer to the person that has a geographic location value that matches the preferred geographic location value and is more proximate to the person during the preferred time-of-day value, relative to presentment via another, unselected one of the currently available transactional channels.

11. The system of claim 10, wherein the current social media site activity data analyzed by natural language processing and linguistic analytics is selected from the group consisting of text message content, chat transcripts, a voice mail message, an email, a complaint, a social media post, and a web click stream.

12. The system of claim 10, wherein the processor executes the program instructions stored on the computer-readable storage medium via the computer readable memory and thereby selects the transactional behavior spending pattern tendency from one or more transactional spending patterns for the person which comprise the group consisting of: a frequency of financial account default, and a time-of-day spending pattern that comprises hours of a day and a percentage of e-commerce purchases during the hours.

13. The system of claim 10, wherein the processor executes the program instructions stored on the computer-readable storage medium via the computer readable memory and thereby:
wherein the item offer is selected from the group consisting of: an offer to purchase overdraft protection of an account of the person, and an offer to purchase an automobile;
generates the item offer which expressly refers to the identified life event occurrence and satisfied an objective of the person arising from the identified life event occurrence; and
wherein the life event is selected from the group consisting of: a program graduation, marriage status change, childbirth, relocation, inheritance, winning a lottery, a job promotion, a new job, and retirement from employment.

14. The system of claim 10, wherein the processor executes the program instructions stored on the computer-readable storage medium via the computer readable memory and thereby:
determines an indication in the transactional behavior spending pattern tendency of a higher likelihood of acceptance by the person of the presented offer when presented via the selected transactional channel from a historic acceptance of the person of a similar offer presented via said selected channel while the person evidenced a personality trait that is similar to the current determined personality trait, and
wherein the current determined negative emotional state is selected from the group consisting of anger, sadness, elation, satisfaction, resignation, introvert, extrovert, openness, closeness, loyalty, interest in self improvement, interest in self enhancement products and services, preference for conservative final planning products and approaches, preference for aggressive financial planning products and approaches, preference for high-risk and high potential reward work opportunities, preference for high-risk and high potential reward investment opportunities, preference for low-risk and moderate potential reward work opportunities, and preference for low-risk and moderate potential reward investment opportunities.

15. The system of claim 14, wherein the processor executes the program instructions stored on the computer-readable storage medium via the computer readable memory and thereby:
   presents the item offer to the person via the selected transactional channel for a time period of acceptance by the person that includes a time of a historic acceptance of the person of a similar offer presented via said selected channel, wherein the item offer is in response to a prior refusal of a prior offer for the item; and
   determines the prior refusal of the prior offer for the item as a function of an indication which is selected from the group consisting of: an elapsed time from a time of the prior offer, a deletion of an email comprising the prior offer, a data input indicating that the prior offer was declined in a telephone call, and a data input indicating that the prior offer was declined in an in-person meeting with a sales representative presenting the prior offer.

16. A computer program product for automated offer generation responsive to behavior attributes, the computer program product comprising:
   a computer readable storage medium having computer readable program code embodied therewith, the computer readable program code comprising instructions for execution by a processor that cause the processor to:
   determine via content analysis of content of a posting by a person on a social media site an occurrence of a life event that has an impact on the person and that is relevant to a decision-making process in accepting an offer;
   determine via natural language processing and linguistic analytics of current social media site activity data applicable to the person that the impact on the person of the life event occurrence comprises a current negative emotional state that is selected from the group consisting of anger, sadness and dismay;
   identify as a function of processing global positioning satellite location data and internet protocol address data a plurality of transactional channels that are each currently available for presentment of an item offer to the person and geographically proximate to a current location of the person and are selected from a group consisting of personal programmable device displays and business locations;
   apply behavior analysis to transaction experience account usage data of the person to determine a preferred time-of-day value and a preferred geographic location value of a transactional behavior spending pattern tendency, wherein the transactional experience account usage data comprises account usage data, transactional history data and the current social media site activity of the person;
   generate an item offer that comprises an attribute value of the item offered that ameliorates the current negative emotional state, satisfies an objective of the person associated to the identified life event occurrence and satisfies a need of the person indicated by demographic data applicable to the person, wherein the demographic data applicable to the person is selected from the group consisting of marital status, household income, household income band, geographic location, average household spending on goods or services within a common category of the offered item; and
   select a one of the plurality of currently available transactional channels for presentment of the item offer to the person that has a geographic location value that matches the preferred geographic location value and is more proximate to the person during the preferred time-of-day value, relative to presentment via another, unselected one of the currently available transactional channels.

17. The computer program product of claim 16, wherein the current social media site activity data analyzed by natural language processing and linguistic analytics is selected from the group consisting of text message content, chat transcripts, a voice mail message, an email, a complaint, a social media post, and a web click stream.

18. The computer program product of claim 16, wherein the computer readable program code instructions for execution by the processor further cause the processor to select the transactional behavior spending pattern tendency from the group consisting of: a frequency of financial account defaults, and a time-of-day spending pattern that comprises hours of a day and a percentage of e-commerce purchases during the hours.

19. The computer program product of claim 16, wherein the computer readable program code instructions for execution by the processor further cause the processor to:
   wherein the item offer is selected from the group consisting of: an offer to purchase overdraft protection of an account of the person, and an offer to purchase an automobile;
   generate the item offer which expressly refers to the identified life event occurrence and satisfies an objective of the person arising from the identified life event occurrence; and
   wherein the life event is selected from the group consisting of: a program graduation, marriage status change, childbirth, relocation, inheritance, winning a lottery, a job promotion, a new job, and retirement from employment.

20. The computer program product of claim 16, wherein the computer readable program code instructions for execution by the processor further cause the processor to:
   determine an indication in the transactional behavior spending pattern tendency of a higher likelihood of acceptance by the person of the presented offer when presented via the selected transactional channel from a historic acceptance of the person of a similar offer presented via said selected channel while the person evidenced a personality trait that is similar to the current determined personality trait, and
   wherein the current determined negative emotional state is selected from the group consisting of anger, sadness, elation, satisfaction, resignation, introvert, extrovert, openness, closeness, loyalty, interest in self improvement, interest in self enhancement products and services, preference for conservative final planning products and approaches, preference for aggressive financial planning products and approaches, preference for high-risk and high potential reward work opportunities, preference for high-risk and high potential reward investment opportunities, preference for low-risk and moderate potential reward work opportunities, and preference for low-risk and moderate potential reward investment opportunities.

* * * * *